United States Patent
Tan

(10) Patent No.: US 10,163,399 B2
(45) Date of Patent: Dec. 25, 2018

(54) DC-DC CONVERSION CONTROL MODULE, DC-DC CONVERTER, AND DISPLAY DEVICE

(71) Applicant: BOE Technology Group Co., Ltd., Beijing (CN)

(72) Inventor: Wenjing Tan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/430,119

(22) Filed: Feb. 10, 2017

(65) Prior Publication Data
US 2017/0243541 A1    Aug. 24, 2017

(30) Foreign Application Priority Data
Feb. 19, 2016    (CN) .......................... 2016 1 0094581

(51) Int. Cl.
G09G 3/3258        (2016.01)
H02M 3/156         (2006.01)

(52) U.S. Cl.
CPC .......... G09G 3/3258 (2013.01); H02M 3/156 (2013.01); *G09G 2310/08* (2013.01);
(Continued)

(58) Field of Classification Search
CPC ............. G09G 3/3258; G09G 2310/08; G09G 2320/0204; G09G 2330/021; H02M 3/156;
(Continued)

(56) References Cited

U.S. PATENT DOCUMENTS

| | | | |
|---|---|---|---|
| 7,994,757 B2 * | 8/2011 | Motomori | H02M 3/156 323/222 |
| 8,354,828 B2 * | 1/2013 | Huang | H02M 1/14 307/31 |

(Continued)

FOREIGN PATENT DOCUMENTS

| CN | 101017452 A | 8/2007 |
|---|---|---|
| CN | 201319644 Y | 9/2009 |

(Continued)

OTHER PUBLICATIONS

Jul. 31, 2017—(CN) First Office Action Appn 201610094581.9 with English Tran.

(Continued)

*Primary Examiner* — Tom Sheng
(74) *Attorney, Agent, or Firm* — Banner & Witcoff, Ltd.

(57) ABSTRACT

This disclosure relates to a DC-DC conversion control module, a DC-DC converter, and a display device. The DC-DC conversion control module includes a voltage input terminal, a control voltage output terminal, and a control sub-module; the control sub-module includes a delay unit, a switch unit, and an output control unit; the delay unit is configured to output a trigger signal after delaying for a time length; the switch unit is configured to, when receiving the trigger signal, make the path between the voltage input terminal and the input terminal of the output control unit be conducted; and the output control unit is configured to output a control voltage. Embodiments of the disclosure can realize adjustable delaying with respect to the output voltage of the DC-DC converter.

19 Claims, 2 Drawing Sheets

(52) U.S. Cl.
CPC ............... *G09G 2320/0204* (2013.01); *G09G 2330/021* (2013.01)

(58) Field of Classification Search
CPC .... H02M 3/1563; H02M 3/157; H02M 3/158; H02M 3/1584
See application file for complete search history.

(56) References Cited

U.S. PATENT DOCUMENTS

| | | | | |
|---|---|---|---|---|
| 9,502,964 | B2* | 11/2016 | Kranz | H02M 3/04 |
| 9,662,985 | B2* | 5/2017 | Arai | H02M 3/156 |
| 2007/0103126 | A1* | 5/2007 | McDonald | H02M 3/1563 |
| | | | | 323/271 |
| 2007/0182396 | A1* | 8/2007 | Inatomi | H02M 3/1563 |
| | | | | 323/283 |
| 2008/0049473 | A1* | 2/2008 | Sugahara | H02M 3/156 |
| | | | | 363/89 |
| 2010/0194369 | A1* | 8/2010 | Nagai | H02M 3/156 |
| | | | | 323/284 |
| 2010/0320991 | A1* | 12/2010 | Yoshino | H02M 3/156 |
| | | | | 323/288 |
| 2012/0242300 | A1* | 9/2012 | Ueno | H02M 3/156 |
| | | | | 323/234 |
| 2014/0169039 | A1* | 6/2014 | Strzalkowski | H02M 3/33569 |
| | | | | 363/17 |
| 2017/0264200 | A1* | 9/2017 | Naito | H02M 3/158 |

FOREIGN PATENT DOCUMENTS

| | | |
|---|---|---|
| CN | 202190258 U | 4/2012 |
| CN | 204290702 U | 4/2015 |
| CN | 105242426 A | 1/2016 |

OTHER PUBLICATIONS

Apr. 16, 2018—(CN) Second Office Action Appn 201610094581.9 with English Tran.

* cited by examiner

DC-DC CONVERSION CONTROL MODULE, DC-DC CONVERTER, AND DISPLAY DEVICE

This application claims priority to and the benefit of Chinese Patent Application No. 201610094581.9 filed on Feb. 19, 2016, which application is incorporated herein in its entirety.

TECHNICAL FIELD

The present disclosure relates to the technical field of voltage conversion, and more particularly, to a DC-DC conversion control module, a DC-DC converter, and a display device.

BACKGROUND

During screen light-on of a display device, respective voltages in a display panel must conform to a designated timing sequence in order to make a display screen operate normally. At present, during screen light-on, a light-on device is usually adopted to convert an operating voltage, thereafter to output respective voltages used to control a timing sequence of screen light-on. However, the light-on device adopted at present cannot realize adjustable delaying with respect to an output voltage during conversion of the operating voltage, and cannot meet a power-up timing sequence requirement of the display device.

SUMMARY

The embodiments of the present disclosure can achieve adjustable delaying with respect to an output voltage of a DC-DC converter.

Correspondingly, the present disclosure provides a DC-DC conversion control module, a DC-DC converter, and a display device.

In a first aspect, the DC-DC conversion control module provided by the present disclosure comprises a voltage input terminal, a control voltage output terminal, and a control sub-module, wherein the control sub-module comprises a delay unit, a switch unit, and an output control unit, wherein the delay unit is configured to, when receiving a delay adjusting signal, determine a time length that needs to be delayed for according to the delay adjusting signal, and output a trigger signal after delaying for the time length;

the switch unit is connected to an output terminal of the delay unit, arranged between the voltage input terminal and an input terminal of the output control unit, and configured to, when receiving the trigger signal, make the path between the voltage input terminal and the input terminal of the output control unit be conducted; and the output control unit is configured to, when receiving an operating voltage at the input terminal, output a control voltage used to control the DC-DC conversion module to perform a voltage conversion at the control voltage output terminal.

Optionally, the number of the control sub-module is one; the delay unit comprises a decoder and a plurality of delay branches connected to the decoder, respective delay branches corresponding to different delay time lengths, and an output terminal of each delay branch being connected to the switch unit;

the decoder is configured to parse the received delay adjusting signal, determine a time length that needs to be delayed for, and output a delay branch turn-on signal according to the determined delay time length;

each delay branch delays for a corresponding time length and outputs a trigger signal upon receiving the delay branch turn-on signal.

Optionally, the number of the control sub-module and the number of the control voltage output terminal both are multiple, and each control sub-module and each control voltage output terminal are connected one to one;

the delay unit in each control sub-module is configured to determine whether the delay unit needs to delay an output according to the delay adjusting signal, and when it is determined as positive, determine a time length that needs to be delayed for according to the delay adjusting signal, and delay for the time length and output a trigger signal.

Optionally, the delay unit comprises a decoder and a plurality of delay branches connected to the decoder, respective delay branches corresponding to different delay time lengths, and an output terminal of each delay branch being connected to the switch unit;

the decoder is configured to parse the received delay adjusting signal, determine whether the delay unit needs to delay an output according to the parsed signal, and when it is determined as positive, determine a time length that needs to be delayed for, and output a delay branch turn-on signal according to the determined delay time length;

each delay branch delays for a corresponding time length and outputs a trigger signal upon receiving the delay branch turn-on signal.

Optionally, the DC-DC conversion control module further comprises an operating voltage terminal and a ground terminal;

each delay branch comprising a transistor, a resistor, and a capacitor, wherein a gate of the transistor is connected to an output terminal of the decoder, one of a source and a drain of the transistor is connected to the operating voltage terminal, and the other of the source and the drain of the transistor is connected to one terminal of the resistor;

the other terminal of the resistor is connected to one terminal of the capacitor, and the other terminal of the capacitor is connected to the ground terminal;

a connection point of the resistor and the capacitor serves as an output terminal of the delay unit and is connected to the switch unit of the control sub-module which the delay unit pertains to.

Optionally, the switch unit is a transistor, a gate of the transistor is connected to an output terminal of the delay unit, one of a source and a drain of the transistor is connected to the voltage input terminal, and the other of the source and the drain of the transistor is connected to the input terminal of the output control unit.

Optionally, the DC-DC conversion control module further comprises a signal detection sub-module;

an input terminal of the signal detection sub-module is configured to receive an adjusting signal, an output terminal of the signal detection sub-module is connected to the control sub-module and configured to convert the received adjusting signal into a delay adjusting signal with a format which can be recognized by the delay unit and transmit the converted delay adjusting signal to each control sub-module.

Optionally, the delay unit is a nano-scale chip.

In a second aspect, the DC-DC converter provided by the present disclosure comprises any of the DC-DC conversion control module described above and a DC-DC conversion module, wherein the control voltage output terminal of the DC-DC conversion control module is connected to the DC-DC conversion module;

the DC-DC conversion module is configured to perform DC-DC voltage conversion when receiving a control voltage outputted from the DC-DC conversion control module.

In a third aspect, the display device provided by the present disclosure comprises the DC-DC converter described above.

In the present disclosure, the delay unit in the control sub-module is adopted to parse the received delay adjusting signal, a time length that needs to be delayed for is determined according to the parsed signal, and thereafter a trigger signal is output after the time length is delayed. After receiving the trigger signal, the switch unit makes the path between the voltage input terminal and the input terminal of the output control unit be conducted. When the input terminal of the output control unit receives an operating voltage, the output control unit outputs a control voltage to control the DC-DC conversion module to perform a voltage conversion. Accordingly, the embodiments of the present disclosure can, according to the delay adjusting signal set as needed, perform delaying for a corresponding time length and then output a control voltage, and further use the control voltage to control a voltage conversion of the DC-DC conversion module, so as to realize adjustable delaying with respect to the output voltage of the DC-DC converter.

BRIEF DESCRIPTION OF THE DRAWINGS

Features and advantages of the present disclosure will be more clearly understood with reference to the accompanying drawings, which are schematic and should not be construed as limiting the present disclose in any way. In the drawings.

REFERENCE SIGNS

100—control sub-module; 101—delay unit; 102—switch unit; 103—output control unit; and 200—signal detection sub-module.

DETAILED DESCRIPTION OF THE EMBODIMENTS

Hereinafter, the present disclosure will be described in further detail with reference to the accompanying drawings and the specific embodiments, in order to more clearly understand the above objectives, features, and advantages of the present disclosure, it should be understood that in the case of no conflict, the embodiments of the present application and specific features thereof can be combined.

In the following description, numerous specific details are illustrated in order to provide a thorough understanding of the present disclosure, but the present disclosure can also be implemented in other specific manners different from those described herein, thus, the protection scope of the present disclosure is not limited to the specific embodiments disclosed as below.

Figure 1:
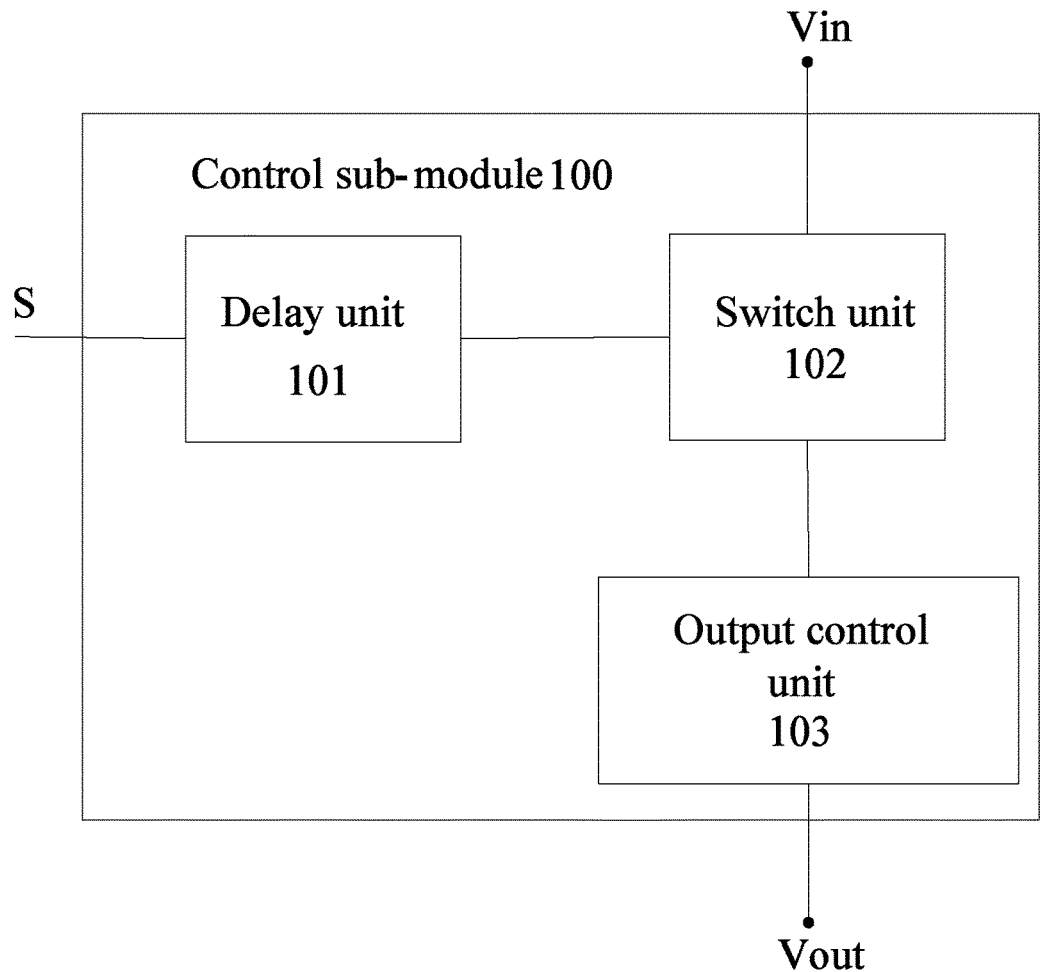
FIG. 1 illustrates a structural schematic diagram of a DC-DC conversion control module according to an embodiment of the present disclosure.
Figure 2:
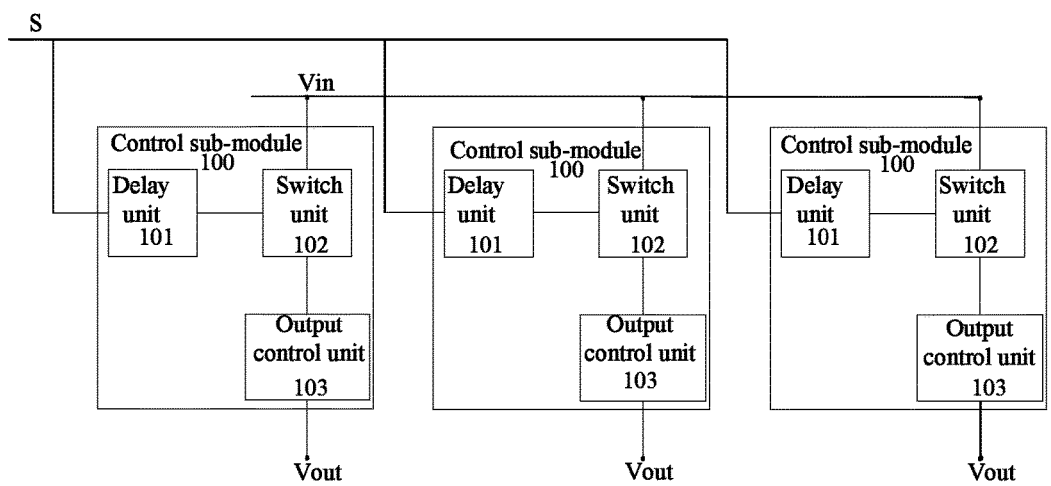
FIG. 2 illustrates a structural schematic diagram of a DC-DC conversion control module according to another embodiment of the present disclosure.

In a first aspect, the present disclosure provides a DC-DC conversion control module, as illustrated in FIGS. 1 and 2, the DC-DC conversion control module comprises a voltage input terminal Vin, a control voltage output terminal Vout, and further comprises a control sub-module 100, the control sub-module 100 comprises a delay unit 101, a switch unit 102, and an output control unit 103, wherein the delay unit 100 is configured to, when receiving a delay adjusting signal S, determine a time length that needs to be delayed for according to the delay adjusting signal S, and output a trigger signal after delaying for the time length;

the switch unit 102 is connected to an output terminal of the delay unit 101, arranged between the voltage input terminal Vin and an input terminal of the output control unit 103, and configured to, when receiving the trigger signal, make the path between the voltage input terminal Vin and the input terminal of the output control unit 103 be conducted; and the output control unit 103 is configured to, when receiving an operating voltage at its input terminal, output a control voltage used to control the DC-DC conversion module to perform voltage conversion at the control voltage output terminal Vout.

According to the above technical solution, the present disclosure can perform delaying for a corresponding time length according to the delay adjusting signal S, and thereafter output a control voltage that controls voltage conversion of the DC-DC conversion module, so as to realize adjustable delaying with respect to the output voltage of the DC-DC converter.

As will be understood, the delay adjusting signal S, as an external control signal that can be set as needed, carries delay-associated information such as a delay time length etc.

As will be understood, when the path between the voltage input terminal Vin and the input terminal of the output control unit 103 is conducted and the operating voltage is received at the voltage input terminal Vin, the input terminal of the output control unit 103 receives an operating voltage.

In a specific implementation, the number of the control sub-module 100 can be one, as illustrated in FIG. 1, of course, the number of the control sub-module 100 can also be multiple, as illustrated in FIG. 2. In a specific implementation, a specific number of the control sub-module 100 can be set as needed.

When the number of the control sub-module 100 is multiple, the number of the control voltage output terminal Vout can be multiple, and each control sub-module 100 and each control voltage output terminal Vout are connected one to one. In this case, the delay unit 101 in each control sub-module 100 is specifically configured to determine whether the delay unit 101 needs to delay an output according to the delay adjusting signal S, and when it is determined as positive, determine a time length that needs to be delayed for according to the delay adjusting signal S, and output a trigger signal after delaying for the time length. In this manner, delay control on multiple control voltages can be achieved.

In a specific implementation, the delay unit 101 herein can be implemented in multiple structures. For example, in an optional structure, the delay unit 101 described above can comprise a decoder and a plurality of delay branches connected to the decoder, each delay branch corresponds to a different delay time length, and an output terminal of each delay branch is connected to the switch unit 102.

When the number of the control sub-module 100 in the DC-DC conversion control module is merely one, the decoder in the delay unit 101 is configured to parse a received delay adjusting signal S, thereafter directly determine a time length that needs to be delayed for, and output a delay branch turn-on signal according to the determined delay time length; each delay branch in the delay unit 101 delays for a corresponding time length and outputs a trigger signal upon receiving the delay branch turn-on signal.

When the number of the control sub-module 100 in the DC-DC conversion control module is multiple, the decoder in the delay unit 101 is configured to parse a received delay adjusting signal S, determine whether the delay unit 101 needs to delay an output according to the delay adjusting signal, and when it is determined as positive, determine a time length that needs to be delayed for, and output a delay branch turn-on signal according to the determined delay time length. Each delay branch delays for a corresponding time length and outputs a trigger signal upon receiving the delay branch turn-on signal.

Figure 3:
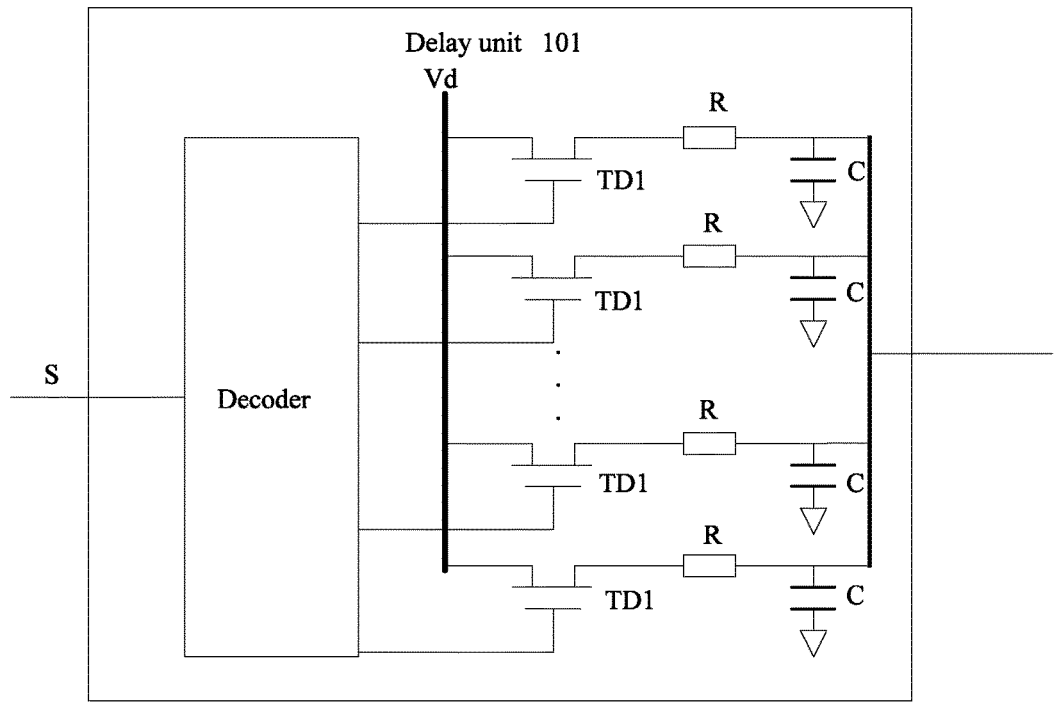
FIG. 3 illustrates a structural schematic diagram of a delay unit in a DC-DC conversion control module according to an embodiment of the present disclosure.

Further, no matter the number of the control sub-module 100 is one or multiple, as illustrated in FIG. 3, the DC-DC conversion control module provided by the present disclosure can further comprise an operating voltage terminal Vd and a ground terminal; each delay branch comprises a transistor TD1, a resistor R, and a capacitor C, wherein
 a gate of the transistor TD1 is connected to the decoder, one of a source and a drain of the transistor is connected to the operating voltage terminal Vd, and the other of the source and the drain of the transistor is connected to one terminal of the resistor R;
 the resistor R is arranged between the transistor TD1 and the switch unit 102 of the control sub-module 100 which the transistor TD1 pertains to,
 one terminal of the capacitor C is connected between the resistor R and the switch unit 102 in the control sub-module 100 which the transistor TD1 pertains to, and the other terminal of the capacitor C is connected to the ground terminal.

It should be understood that, when the gate of the transistor TD1 in the delay branch receives a turn-on signal, the operating voltage Vd can ensure that the path between the source and the drain of the transistor TD1 is conducted.

In practice, it is supposed that, when the decoder in a delay unit 101 pareses the received delay adjusting signal S and learns that the delay unit should delay for a time length t, then the decoder transmits a turn-on signal to the delay branch that can delay for the time length t; when the delay branch receives this turn-on signal, the transistor TD1 in this delay branch is turned on. The turn-on signal arrives at the switch unit 102 through the transistor TD1 and then through the resistor R and the capacitor C in the delay branch. Herein, the delay branches with different delay time lengths can be formed by resistors and capacitors with different characteristics, so that the implementation manner is simple and convenient.

Figure 4:
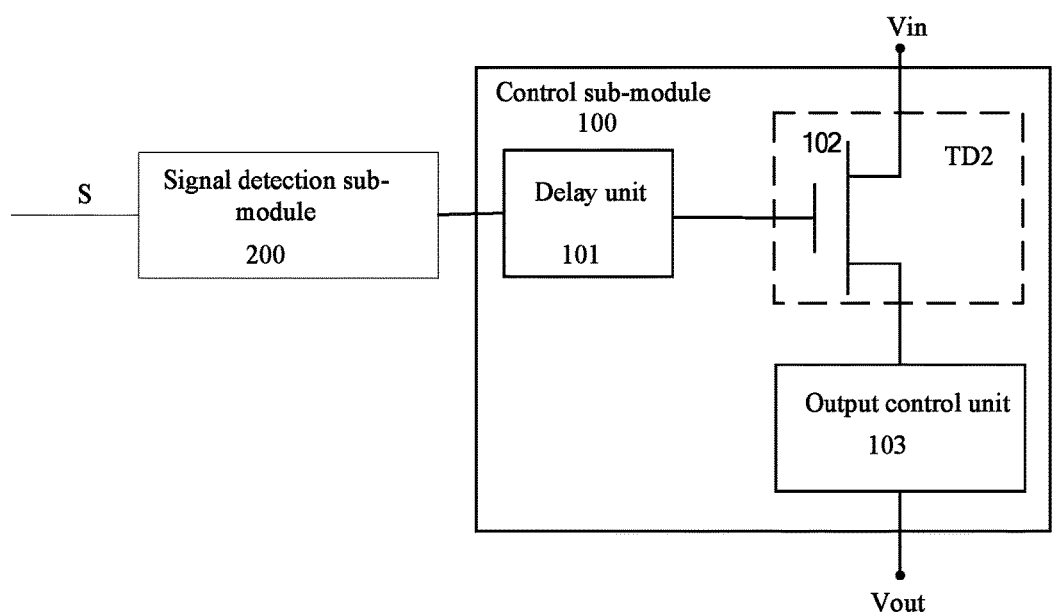
FIG. 4 illustrates a structural schematic diagram of a DC-DC conversion control module according to yet another embodiment of the present disclosure

In a specific implementation, as illustrated in FIG. 4, the switching unit 102 can adopt a transistor TD2, a gate of the transistor TD2 is connected to an output terminal of the delay unit 101, one of a source and a drain of the transistor TD2 is connected to the voltage input terminal Vin, and the other of the source and the drain of the transistor TD2 is connected to the input terminal of the output control unit 103. When the delay unit 101 issues a trigger signal, after the gate of the transistor TD2 which serves as the switch unit 102 receives the trigger signal, the path between the source and the drain of the transistor TD2 is conducted, so that the path between the voltage input terminal Vin and the input terminal of the output control unit 103 is conducted. Adopting the transistor TD2 as the switch unit 102 is simple and convenient.

In a specific implementation, the delay unit 101 can adopt a nano-scale chip. As will be understood, the nano-scale chip refers to a chip manufactured by adopting a nano manufacturing process; it has advantages such as high integration, small size, and high control precision. And since the nano-scale chip can effectively shield an affect caused by external interference on the delay precision, thus it facilitates output delaying of a circuit with a high precision.

In a specific implementation, as illustrated in FIG. 4, the DC-DC conversion control module provided by the present disclosure can further comprise a signal detection sub-module 200;
 an output terminal of the signal detection sub-module 200 is connected to each control sub-module 100 and configured to convert a received adjusting signal S into a delay adjusting signal S with a format which can be recognized by the delay unit 101 and transmit the converted delay adjusting signal S to each control sub-module 100.
 The benefits of this is that since the signal detection sub-module 200 can perform a format conversion on the detected delay adjusting signal S, thus the DC-DC conversion control module provided by the present disclosure can receive the delay adjusting signal S having multiple different formats, and can be applied in a more broad range. However, in practice, the signal detection sub-module 200 is not a structure necessarily required.

It is not difficult to understand that, the signal detection sub-module 200 can perform a format conversion on the delay adjusting signal S according to a single-line communication protocol. In this case, the detected delay adjusting signal S can be transmitted by adopting a single line.

It should be understood that, although the signal detection sub-module 200 illustrated in FIG. 4 is connected to merely one control sub-module 100, when the DC-DC conversion control module has multiple control sub-modules 100, the signal detection sub-module 200 can be connected to each control sub-module 100 contained in the DC-DC conversion control module.

It is not difficult to understand that, although the transistor is adopted as the switch unit 102 and the signal detection sub-module 200 is arranged in FIG. 4, it is not necessary to arrange the detection sub-module 200 while adopting the transistor as the switch unit 102 in practice.

In a second aspect, the present disclosure further provides a DC-DC converter comprising the DC-DC conversion control module described above and a DC-DC conversion module, wherein the control voltage output terminal Vout of the DC-DC conversion control module is connected to the DC-DC conversion module;
 the DC-DC conversion module is configured to perform DC-DC voltage conversion upon receiving a control voltage outputted from the DC-DC conversion control module.

In the DC-DC converter provided by the present disclosure, the DC-DC conversion module can output a control voltage after delaying for a corresponding time length according to the delay adjusting signal S, and the DC-DC conversion module performs DC-DC voltage conversion according to the received control voltage. Since the delay adjusting signal S can be set as needed, thus the present disclosure can achieve adjustable delaying with respect to the output voltage of the DC-DC converter. When the DC-DC converter provided by the present disclosure is applied to a display device, the power-up timing sequence requirement of the display device can be met.

In addition, in comparison to the known light-on device having the defects such as large volume, poor mobility, worse portability, and limited output capability, inconvenience for the product to be lighted on and so on, the DC-DC converter provided by the present disclosure has advantages of simple structure, accurate power-on, good portability, convenience for the product to be lighted on, and multi-channel output capability and so on.

In a third aspect, the present disclosure further provides a display device comprising the DC-DC converter described above.

In a specific implementation, the display device provided by the present disclosure can be an OLED display but not limited thereto. In the display device provided by the present disclosure, since delaying of the output voltage of the DC-DC converter is adjustable, the output voltage of the DC-DC converter can be adjusted as needed, to obtain multiple voltages which conform to a designated timing sequence, so that the display screen can operate normally.

In the present disclosure, the terms "first" and "second" are used for the purpose of description only and are not to be construed as indicating or implying relative importance. The term "multiple/a plurality of" refers to two or more than two, unless otherwise specified.

Although the implementations of the present disclosure are described in combination with the drawings, those skilled in the art can make various modifications and variants without departing from the spirit and scope of the present disclosure, such modifications and variants all fall into the scope defined by the attached claims.

This application claims priority right of Chinese Patent Application No. 201610094581.9 filed on Feb. 19, 2016, the disclosure of which is incorporated in entirety herein by reference as a portion of the present disclosure.

What is claimed is:

1. A DC-DC conversion control module for controlling a DC-DC conversion module, comprising a voltage input terminal, a control voltage output terminal, and a control sub-module, the control sub-module comprising a delay unit, a switch unit, and an output control unit, wherein
the delay unit is configured to, when receiving a delay adjusting signal, determine a time length that needs to be delayed for according to the delay adjusting signal, and output a trigger signal after delaying for the time length;
the switch unit is connected to an output terminal of the delay unit, arranged between the voltage input terminal and an input terminal of the output control unit, and configured to, when receiving the trigger signal, make a path between the voltage input terminal and the input terminal of the output control unit be conducted; and
the output control unit is configured to, when receiving an operating voltage at its input terminal, output a control voltage used to control the DC-DC conversion module to perform voltage conversion at the control voltage output terminal.

2. The DC-DC conversion control module according to claim 1, wherein the number of the control sub-module is one;
the delay unit comprises a decoder and a plurality of delay branches connected to the decoder, respective delay branches corresponding to different delay time lengths, and an output terminal of each delay branch being connected to the switch unit;
the decoder is configured to parse the received delay adjusting signal, determine the time length that needs to be delayed for, and output a delay branch turn-on signal according to the determined time length; and
each delay branch delays for a corresponding time length and outputs the trigger signal upon receiving the delay branch turn-on signal.

3. The DC-DC conversion control module according to claim 2, further comprising an operating voltage terminal and a ground terminal;
each delay branch comprising a transistor, a resistor, and a capacitor, wherein
a gate of the transistor is connected to an output terminal of the decoder, one of a source and a drain of the transistor is connected to the operating voltage terminal, and the other of the source and the drain of the transistor is connected to one terminal of the resistor;
the other terminal of the resistor is connected to one terminal of the capacitor, and the other terminal of the capacitor is connected to the ground terminal; and
a connection point of the resistor and the capacitor serves as an output terminal of the delay unit and is connected to the switch unit of the control sub-module which the delay unit pertains to.

4. The DC-DC conversion control module according to claim 1, wherein
the number of the control sub-module and the number of the control voltage output terminal both are multiple, and each control sub-module and each control voltage output terminal are connected one to one; and
the delay unit in each control sub-module is configured to determine whether the delay unit needs to delay an output according to the delay adjusting signal, and when it is determined as positive, determine a time length that needs to be delayed for according to the delay adjusting signal, and delay for the time length and output the trigger signal.

5. The DC-DC conversion control module according to claim 4, wherein
the delay unit comprises a decoder and a plurality of delay branches connected to the decoder, respective delay branches corresponding to different delay time lengths, and an output terminal of each delay branch being connected to the switch unit;
the decoder is configured to parse the received delay adjusting signal, determine whether the delay unit needs to delay an output according to the parsed signal, and when it is determined as positive, determine a time length that needs to be delayed for, and output a delay branch turn-on signal according to the determined time length; and
each delay branch delays for a corresponding time length and outputs a trigger signal upon receiving the delay branch turn-on signal.

6. The DC-DC conversion control module according to claim 5, further comprising an operating voltage terminal and a ground terminal;
each delay branch comprising a transistor, a resistor, and a capacitor, wherein
a gate of the transistor is connected to an output terminal of the decoder, one of a source and a drain of the transistor is connected to the operating voltage terminal, and the other of the source and the drain of the transistor is connected to one terminal of the resistor;
the other terminal of the resistor is connected to one terminal of the capacitor, and the other terminal of the capacitor is connected to the ground terminal; and
a connection point of the resistor and the capacitor serves as an output terminal of the delay unit and is connected to the switch unit of the control sub-module which the delay unit pertains to.

7. The DC-DC conversion control module according to claim 1, wherein
the switch unit is a transistor, a gate of the transistor is connected to the output terminal of the delay unit, one of a source and a drain of the transistor is connected to the voltage input terminal, and the other of the source and the drain of the transistor is connected to the input terminal of the output control unit.

8. The DC-DC conversion control module according to claim 1, further comprising a signal detection sub-module, wherein
an input terminal of the signal detection sub-module is configured to receive an adjusting signal, an output terminal of the signal detection sub-module is connected to the control sub-module and configured to convert the received adjusting signal into a delay adjusting signal with a format which can be recognized by the delay unit and transmit the converted delay adjusting signal to the control sub-module.

9. The DC-DC conversion control module according to claim 1, wherein the delay unit is a nano-scale chip.

10. A DC-DC converter comprising the DC-DC conversion control module according to claim 1 and DC-DC conversion module, wherein the control voltage output terminal of the DC-DC conversion control module is connected to the DC-DC conversion module; and
the DC-DC conversion module is configured to perform a DC-DC voltage conversion when receiving a control voltage outputted from the DC-DC conversion control module.

11. A display device, comprising the DC-DC converter according to claim 10.

12. The DC-DC converter according to claim 10, wherein
the number of the control sub-module is one;
the delay unit comprises a decoder and a plurality of delay branches connected to the decoder, respective delay branches corresponding to different delay time lengths, and an output terminal of each delay branch being connected to the switch unit;
the decoder is configured to parse the received delay adjusting signal, determine the time length that needs to be delayed for, and output a delay branch turn-on signal according to the determined time length; and
each delay branch delays for a corresponding time length and outputs a trigger signal upon receiving the delay branch turn-on signal.

13. The DC-DC converter according to claim 12, further comprising an operating voltage terminal and a ground terminal;
each delay branch comprising a transistor, a resistor, and a capacitor, wherein
a gate of the transistor is connected to an output terminal of the decoder, one of a source and a drain of the transistor is connected to the operating voltage terminal, and the other of the source and the drain of the transistor is connected to one terminal of the resistor;
the other terminal of the resistor is connected to one terminal of the capacitor, and the other terminal of the capacitor is connected to the ground terminal; and
a connection point of the resistor and the capacitor serves as the output terminal of the delay unit and is connected to the switch unit of the control sub-module which the delay unit pertains to.

14. The DC-DC converter according to claim 10, wherein
the number of the control sub-module and the number of the control voltage output terminal both are multiple, and each control sub-module and each control voltage output terminal are connected one to one; and
the delay unit in each control sub-module is configured to determine whether the delay unit needs to delay an output according to the delay adjusting signal, and when it is determined as positive, determine a time length that needs to be delayed for according to the delay adjusting signal, and delay for the time length and output the trigger signal.

15. The DC-DC converter according to claim 14, wherein
the delay unit comprises a decoder and a plurality of delay branches connected to the decoder, respective delay branches corresponding to different delay time lengths, and an output terminal of each delay branch being connected to the switch unit;
the decoder is configured to parse the received delay adjusting signal, determine whether the delay unit needs to delay an output according to the parsed signal, and when it is determined as positive, determine a time length that needs to be delayed for, and output a delay branch turn-on signal according to the determined time length; and
each delay branch delays for a corresponding time length and outputs a trigger signal upon receiving the delay branch turn-on signal.

16. The DC-DC converter according to claim 15, further comprising an operating voltage terminal and a ground terminal;
each delay branch comprising a transistor, a resistor, and a capacitor, wherein
a gate of the transistor is connected to an output terminal of the decoder, one of a source and a drain of the transistor is connected to the operating voltage terminal, and the other of the source and the drain of the transistor is connected to one terminal of the resistor;
the other terminal of the resistor is connected to one terminal of the capacitor, and the other terminal of the capacitor is connected to the ground terminal; and
a connection point of the resistor and the capacitor serves as an output terminal of the delay unit and is connected to the switch unit of the control sub-module which the delay unit pertains to.

17. The DC-DC converter according to claim 10, wherein
the switch unit is a transistor, a gate of the transistor is connected to the output terminal of the delay unit, one of a source and a drain of the transistor is connected to the voltage input terminal, and the other of the source and the drain of the transistor is connected to the input terminal of the output control unit.

18. The DC-DC converter according to claim 10, further comprising a signal detection sub-module, wherein
an input terminal of the signal detection sub-module is configured to receive an adjusting signal, an output terminal of the signal detection sub-module is connected to the control sub-module and configured to convert the received adjusting signal into a delay adjusting signal with a format which can be recognized by the delay unit and transmit the converted delay adjusting signal to the control sub-module.

19. The DC-DC converter according to claim 10, wherein the delay unit is a nano-scale chip.

* * * * *